(12) United States Patent
Uva (10) Patent No.: US 12,189,912 B2
(45) Date of Patent: Jan. 7, 2025

(54) SECURE MESSAGING SYSTEMS AND METHODS

(71) Applicant: Uva IP LLC, Miami, FL (US)

(72) Inventor: Luis Uva, Miami, FL (US)

(*) Notice: Subject to any disclaimer, the term of this patent is extended or adjusted under 35 U.S.C. 154(b) by 0 days.

(21) Appl. No.: 18/239,299

(22) Filed: Aug. 29, 2023

(65) Prior Publication Data
US 2024/0012528 A1  Jan. 11, 2024

Related U.S. Application Data

(63) Continuation of application No. 17/682,774, filed on Feb. 28, 2022, now Pat. No. 11,797,144, which is a continuation-in-part of application No. 15/369,319, filed on Dec. 5, 2016, now abandoned.

(60) Provisional application No. 62/268,315, filed on Dec. 16, 2015, provisional application No. 62/263,311, filed on Dec. 4, 2015.

(51) Int. Cl.
| | |
|---|---|
| *H04L 67/141* | (2022.01) |
| *G06F 3/0481* | (2022.01) |
| *G06Q 30/0282* | (2023.01) |

(52) U.S. Cl.
CPC ....... *G06F 3/0481* (2013.01); *G06Q 30/0282* (2013.01); *H04L 67/141* (2013.01)

(58) Field of Classification Search
CPC .. G06F 3/0481; G06Q 30/0282; H04L 67/141
See application file for complete search history.

(56) References Cited

U.S. PATENT DOCUMENTS

| | | |
|---|---|---|
| 2006/0277101 A1 | 12/2006 | Bunn |
| 2016/0086241 A1 | 3/2016 | Proulx |
| 2017/0053299 A1* | 2/2017 | Rozga ............... G06Q 30/0203 |
| 2017/0068974 A1 | 3/2017 | Firestone |
| 2017/0098227 A1* | 4/2017 | Cook ................. G06Q 30/0203 |
| 2019/0042081 A1* | 2/2019 | Rosenberg ............ H04L 67/535 |

OTHER PUBLICATIONS

Fernando Mendez et al., Methodological Challenges in the analysis of voting advice application generated data, Nov. 1, 2014, International Workshop on Semantic and Social Media Adaptation and Personalization, pp. 142-148 (Year: 2014).*

Sul Kassicieh et al., Human Centric Cyber Security: What are the New Trends in Data Protection?, Aug. 1, 2015, Proceedings of PICMET '15: Management of the Technology Age, pp. 1321-1338 (Year: 2015).*

Savandie Abeyratna et al., "An Affective Interface for Conveying User Feedback", Mar. 1, 2010, IEEE Xplore, pp. 369-374 (Year: 2010).

(Continued)

*Primary Examiner* — Tam T Tran
(74) *Attorney, Agent, or Firm* — Caldwell Intellectual Property Law (57) ABSTRACT

Provided herein are exemplary systems and methods for an intelligent secure networked system configured by at least one processor to execute instructions stored in memory, the system including a data retention system and an emotional analytics system, the emotional analytics system performing asynchronous processing to determine if interactions with a user's computing device are such that the user is responding from an emotional state of mind or a meditated state of mind.

20 Claims, 11 Drawing Sheets

(56) References Cited

OTHER PUBLICATIONS

Wenhua Liu et al., "Mediating Roles of Customer Emotion on the Relationship between Positive Customer Paticipation and Customer Satisfaction in Microblog", Dec. 12, 2014, IEEE Xplore, pp. 309-312 (Year: 2014).

\* cited by examiner

All Responses
*[No Filters Applied]*

| % | Qty | Avg Time | Dollars |
|---|---|---|---|
| 100% | 67 | 25.3 sec | $130,489 |

Q1 - How Customers Feel

| % | | | |
|---|---|---|---|
| 92% | ☺ | | $120,050 |
| 8% | ☺ + ☹ | | $10,439 |
| 100% | | | $130,489 |

Q2 - What Matters Most

| | Sales % | Sales | Leverage ☺ | Improve ☺☹ |
|---|---|---|---|---|
| People | 50% | 65K | 63K | 2K |
| Product | 25% | 33K | 26K | 7K |
| Website | 25% | 32K | 31K | 1K |
| Total | 100% | 130K | 120K | 10K |

Q3 - What Specific Attribute Matters Most +

| Meets Response Parameters For: | Response Time Sec. |
|---|---|
| Q1,Q2,Q3 | 16.2 |
| None | 16.3 |
| Q1,Q2,Q3 | 16.4 |
| None | 16.2 |
| None | 16.3 |
| Q1,Q2,Q3 | 16.4 |
| Q1 | 16.4 |
| Q1,Q2,Q3 | 16.2 |
| None | 16.3 |
| Q1,Q2,Q3 | 16.4 |
| Q1 | 16.4 |
| Q1 | 16.4 |
| Q1,Q2,Q3 | 16.5 |
| Q1, Q2 | 16.6 |
| Q1 | 16.7 |

All Responses:

*[No Parameters Applied]*

No filters applied. It shows that the system collected 100% customer feedback. It does not filter for quality of feedback as it relates to the use for decision-making.

*FIG. 5*

| | What? [Q1 Filter Level Met] | | | | | | Unacceptable Responses: 3% (2 out of 67) | | What? [Q1 Filter Level Met] |
|---|---|---|---|---|---|---|---|---|---|
| % | Qty | Avg Time | | Dollars | | | Meets Response Parameters For: | Response Time Sec. | It only includes Q1 feedback responses that meet the minimum time it would take a human being ("human time") to read and respond Q1 (Excluding all Q1 responses that do not meet this minimum requirement) |
| | 65 | 17.6 sec | | $126,547 | | | Q1 | 16.2 | |
| | Q1 - How Customers Feel | | | | | | Q1 | 16.3 | |
| 89% | ☺ | | | $112,651 | | | Q1 | 16.4 | |
| 11% | ☺ + ☺ | | | $13,923 | | | Q1 | 16.4 | Use for decision-making: |
| 100% | | | | $126,574 | | | Q1 | 16.2 | a) Knowing how customer feel about doing business with the company |
| | Q2 - What Matters Most | | | | | | Q1 | 16.3 | |
| | | Sales % | Sales | Leverage ☺ | Improve ☺ | | Q1 | 16.4 | |
| People | | 50% | 50K | 47K | 3K | | Q1 | 16.2 | |
| Product | | 25% | 46K | 44K | 2K | | Q1 | 16.3 | |
| Website | | 25% | 30K | 22K | 8K | | Q1 | 16.4 | |
| Total | | 100% | 126K | 112K | 13K | | Q1 | 16.4 | |
| | Q3 - What Specific Attribute Matters Most + | | | | | | Q1 | 16.5 | |
| | | | | | | | Q1 | 16.6 | |

*FIG. 6*

What? + Where?
[Q1, Q2 Filter Level Met]

| % | Qty | Avg Time | Dollars |
|---|---|---|---|
| 74% | 50 | 20.6 sec | $96,561 |

Q1 - How Customers Feel

| 91% | ☺ | | $87,871 |
| 9% | ☺ + ☺ | | $8,690 |
| 100% | | | 96,561 |

Q2 - What Matters Most

| | Sales % | Sales | Leverage ☺☺ | Improve ☺ |
|---|---|---|---|---|
| People | 69% | 70K | 68K | 3K |
| Product | 21% | 18K | 15K | 3K |
| Website | 10% | 8K | 6K | 2K |
| Total | 100% | 96K | 88K | 8K |

Q3 - What Specific Attribute Matters Most +

Unacceptable Responses: 25% (17 out of 67)

| Meets Response Parameters For: | Response Time Sec. |
|---|---|
| Q1, Q2 | 16.2 |
| Q1, Q2 | 16.3 |
| Q1, Q2 | 16.4 |
| Q1, Q2 | 16.4 |
| Q1, Q2 | 16.2 |
| Q1, Q2 | 16.3 |
| Q1, Q2 | 16.4 |
| Q1, Q2 | 16.2 |
| Q1, Q2 | 16.3 |
| Q1, Q2 | 16.4 |
| Q1, Q2 | 16.4 |
| Q1, Q2 | 16.4 |
| Q1, Q2 | 16.5 |

What? + Where?
[Q1, Q2 Filter Level Met]

It only includes Q1, Q2 feedback responses that meet the minimum time it would take a human being ("human time") to read and respond Q1 and Q2 (Excluding all Q1 and/or Q2 responses that do not meet this minimum requirement)

Use for decision-making:

a) Knowing how customer feel about doing business with the company b) What area of the business matters most to the customer

*FIG. 7*

| What? + Where? + Why? [Q1, Q2, Q3 Filter Level Met] | | | | Unacceptable Responses: 34% (23 out of 67) | | |
|---|---|---|---|---|---|---|
| % | Qty | Avg Time | Dollars | What? + Where? + Why? [Q1, Q2, Q3 Filter Level Met] | | |
| 66% | 44 | 21.6 sec | $83,539 | | | |
| Q1 - How Customers Feel | | | | Meets Response Parameters For: | Response Time Sec. | |
| 95% | | ☺ | $79,363 | Q1,Q2,Q3 | 16.2 | It only includes Q1, Q2, Q3 feedback responses that meet the minimum time it would take a human being ("human time") to read and respond Q1,Q2 and Q3 (Excluding all Q1, Q2 and/or Q3 responses that do not meet this minimum requirement) |
| 5% | | ☺ + ☺ | $4,176 | Q1,Q2,Q3 | 16.3 | |
| | | | | Q1,Q2,Q3 | 16.4 | |
| 100% | | | $83,539 | Q1,Q2,Q3 | 16.4 | |

| Q2 - What Matters Most + Q3 - Why | | | | | | | |
|---|---|---|---|---|---|---|---|
| | Sales % | Sales | Leverage | Improve ☺ ☺ | | | |
| People | 69% | 57K | 56K | 1K | Q1,Q2,Q3 | 16.2 | Use for decision making. (Most Recommended) |
| Knowledge | 35% | 29K | 28K | 1K | Q1,Q2,Q3 | 16.3 | |
| Friendliness | 22% | 18K | 18K | — | Q1,Q2,Q3 | 16.4 | a) Knowing how customer feel about doing business with the company |
| Speed | 8% | 6K | 6K | — | Q1,Q2,Q3 | 16.2 | |
| Commitment | 4% | 3K | 3K | — | Q1,Q2,Q3 | 16.3 | |
| Product | 21% | 17K | 15K | 2K | Q1,Q2,Q3 | 16.4 | b) What area of the business matters most to the customer |
| Quality | 10% | 9K | 7K | 2K | Q1,Q2,Q3 | 16.4 | |
| Details | 8% | 6K | 6K | — | Q1,Q2,Q3 | 16.4 | |
| Inventory | 2% | 1K | 1K | — | Q1,Q2,Q3 | 16.4 | c) Why such area of the business matters to them |
| Photos | 1% | 1K | 1K | — | Q1,Q2,Q3 | 16.5 | |
| Website | 10% | 9K | 8K | 1K | Q1,Q2,Q3 | 16.6 | |
| Quality | 4% | 3K | 2K | 1K | Q1,Q2,Q3 | 16.4 | |
| Details | 2% | 2K | 2K | — | Q1,Q2,Q3 | 16.5 | |
| Inventory | 2% | 2K | 2K | — | Q1,Q2,Q3 | 16.6 | |
| Photos | 2% | 1K | 2K | — | Q1,Q2,Q3 | 16.4 | |
| Total | 100% | 83K | 79K | 4K | Q1,Q2,Q3 | 16.7 | |

*FIG. 8*

Feedback Data Quality Ratings

"All Responses" [No Filters Applied]

No filters applied. It shows that the system collected 100% customer feedback. It does not filter for quality of feedback as it relates to the use for decision-making.

"What" [Q1 Filter Level Met]

It only includes Q1 feedback responses that meet the minimum time it would take a human being ("human time") to read and respond Q1 (Excluding all Q1 responses that do not meet this minimum requirement)

Use for decision making:

a) Knowing how customer feel about doing business with the company

"What + Where" [Q1, Q2, Filter Level Met]

It only includes Q1,Q2 feedback responses that meet the minimum time it would take a human being ("human time") to read and respond Q1 and Q2 (Excluding all Q1 and/or Q2 responses that do not meet this minimum requirement)

Use for decision making:

a) Knowing how customer feel about doing business with the company     b) What area of the business matters most to the customer

"What + Where + Why" [Q1, Q2, Q3 Filter Level Met]

It only includes Q1,Q2,Q3 feedback responses that meet the minimum time it would take a human being ("human time") to read and respond Q1, Q2 and Q3 (Excluding all Q1, Q2 and/or Q3 responses that do not meet this minimum requirement)

Use for decision making: (Most Recommended)

a) Knowing how customer feel about doing business with the company     b) What area of the business matters most to the customer     c) Why such area of the business matters to them

*FIG. 9*

| All Responses [No Filters Applied] ≡ | What [Q1 Filter Level Met] ≡ |
|---|---|
| No filters applied. It shows that the system collected 100% customer feedback. It does not filter for quality of feedback as it relates to the use for decision-making. | It only includes Q1 feedback responses that meet the minimum time it would take a human being ("human time") to read and respond Q1 (Excluding all Q1 responses that do not meet this minimum requirement)<br><br>Use for decision making:<br>a) Knowing how customer feel about doing business with the company |

| % | Qty | Avg Time | Dollars | % | Qty | Avg Time | Dollars |
|---|---|---|---|---|---|---|---|
| | 67 | 25.3 sec | $130,489 | | 65 | 17.6 sec | $126,574 |
| | Q1 - How Customers Feel | | | | Q1 - How Customers Feel | | |
| 92% | ☺ | | $120,050 | 89% | ☺ | | $112,651 |
| 8% | ☹ + ☺ | | $10,439 | 11% | ☹ + ☺ | | $13,923 |
| 100% | | | $130,489 | 100% | | | $126,574 |

| What + Where<br>[Q1, Q2 Filter Level Met] | | | | | | What + Where + Why<br>[Q1, Q2, Q3 Filter Level Met] | | | | | | Control Panel |
|---|---|---|---|---|---|---|---|---|---|---|---|---|
| It only includes Q1,Q2 feedback responses that meet the minimum time it would take a human being ("human time") to read and respond Q1 and Q2 (Excluding all Q1 and/or Q2 responses that do not meet this minimum requirement)<br><br>Use for decision making:<br>a) Knowing how customer feel about doing business with the company<br>b) What area of the business matters most to the customer | | | | | | It only includes Q1,Q2,Q3 feedback responses that meet the minimum time it would take a human being ("human time") to read and respond Q1,Q2 and Q3 (Excluding all Q1, Q2 and/or Q3 responses that do not meet this minimum requirement)<br><br>Use for decision making: (Most Recommended)<br>a) Knowing how customer feel about doing business with the company<br>b) What area of the business matters most to the customer<br>c) Why such area the business matters to them | | | | | | Exclude Feedback When Outside of Following Time Range in Parameters<br><br>Response Time<br>    Min  Max<br>Q1  3    6<br>Q2  4    7<br>Q3  7    10<br><br>Avg Total 14-23 |
| % | Qty | Avg Time | | | | % | Qty | Avg Time | | | | |
| 74% | 50 | 20.6 sec | | | | 66% | 44 | 21.6 sec | | | | |
| Q1 - How Customers Feel | | | | | | Q1 - How Customers Feel | | | | | | |
| | | ☺ | | | | | | ☺ | | | | |
| 91% | | ☺ + ☺ | | | | 95% | | ☺ + ☺ | | | | |
| 9% | | ☹ | | | | 5% | | ☹ | | | | |
| 100% | | | | | | 100% | | | | | | |
| Q2 - What Matters Most | | | | | | Q2 - What Matters Most + Q3 - Why | | | | | | |
| | Sales % | Sales | Leverage ☺ | Dollars | Improve ☹ | | Sales % | Sales | Leverage ☺ | Dollars | Improve ☹ | |
| People | 69% | 70K | 68K | $87,871 | 3K | People | 69% | 57K | 56K | $79,363 | 1K | |
| | | | | | | Knowledge | 35% | 29K | 28K | | 1K | |
| | | | | | | Friendliness | 22% | 18K | 18K | | -- | |
| | | | | | | Speed | 8% | 6K | 6K | | -- | |
| | | | | | | Commitment | 4% | 3K | 3K | | -- | |
| Product | 21% | 18K | 15K | $8,690 | 3K | Product | 21% | 17K | 15K | $4,176 | 2K | |
| | | | | | | Quality | 10% | 9K | 7K | | 2K | |
| | | | | | | Details | 8% | 6K | 6K | | -- | |
| | | | | | | Inventory | 2% | 1K | 1K | | -- | |
| | | | | | | Photos | 1% | 1K | 1K | | -- | |
| Website | 10% | 8K | 6K | | 2K | Website | 10% | 9K | 8K | | 1K | |
| | | | | | | Quality | 4% | 3K | 2K | | 1K | |
| | | | | | | Details | 2% | 2K | 2K | | -- | |
| | | | | | | Inventory | 2% | 2K | 2K | | -- | |
| | | | | | | Photos | 2% | 1K | 1K | | -- | |
| Total | 100% | 96K | 88K | $96,561 | 8K | Total | 100% | 83K | 79K | $83,539 | 4K | |

*FIG. 10 (CONT)*

SECURE MESSAGING SYSTEMS AND METHODS

CROSS-REFERENCE TO RELATED APPLICATIONS

This application is a continuation of Non-provisional application Ser. No. 17/682,774 filed on Feb. 28, 2022 and entitled "SECURE MESSAGING SYSTEMS AND METHODS," which is a continuation-in-part of U.S. Non-Provisional patent application Ser. No. 15/369,319 filed on Dec. 5, 2016, and additionally claims priority to U.S. provisional patent application Ser. No. 62/263,311 filed on Dec. 4, 2015 and U.S. provisional patent application Ser. No. 62/268,315 filed on Dec. 16, 2015, each of which is incorporated herein by reference in its entirety.

FIELD OF THE INVENTION

The present technology relates generally to secure messaging, and more particularly, but not by limitation, to systems and methods for secure messaging that allow modular subsystem isolation, as well as latency remediation and improved user experiences.

SUMMARY OF THE DISCLOSURE

In an aspect, a system for gathering qualifying responses may include a user device configured to communicate to the user a first prompt as, wherein the first prompt is directed to the user's emotion; receive a first response from the user; determine a first response time; communicate to the user a second prompt, wherein the second prompt is directed to a cause of the user's emotion, wherein the second prompt is communicated to the user after the first prompt is communicated to the user; receive a second response from the user; determine a second response time; communicate to the user a third prompt, wherein the third prompt is directed to a more specific cause of the user's emotion, wherein the third prompt is communicated to the user after the second prompt is communicated to the user; receive a third response from the user; and determine a third response time; and transmit the first, second, and third responses, and the first, second, and third response times to a computing device; and a computing device configured to: receive the first, second, and third responses, and the first, second, and third response times from the user device; identify the minimum time necessary for a human to read and respond to the first prompt; identify the minimum time necessary for a human to read and respond to the second prompt; identify the minimum time necessary for a human to read and respond to the third prompt; and determine whether the first, second and third responses are qualifying responses as a function of the first, second and third response times and the minimum time necessary for a human to read and respond to the first, second and third prompts.

In another aspect, a method of gathering qualifying responses may include using a user device, communicating to the user a first prompt as, wherein the first prompt is directed to the user's emotion; using a user device, receiving a first response from the user; using a user device, determining a first response time; using a user device, communicating to the user a second prompt, wherein the second prompt is directed to a cause of the user's emotion, wherein the second prompt is communicated to the user after the first prompt is communicated to the user; using a user device, receiving a second response from the user; using the user device, determining a second response time; using the user device, communicating to the user a third prompt, wherein the third prompt is directed to a more specific cause of the user's emotion, wherein the third prompt is communicated to the user after the second prompt is communicated to the user; using the user device, receiving a third response from the user; and using the user device, determining a third response time; and using the user device, transmitting the first, second, and third responses, and the first, second, and third response times to a computing device; and using a computing device, receiving the first, second, and third responses, and the first, second, and third response times from the user device; using the computing device, identifying the minimum time necessary for a human to read and respond to the first prompt; using the computing device, identifying the minimum time necessary for a human to read and respond to the second prompt; using the computing device, identifying the minimum time necessary for a human to read and respond to the third prompt; and using the computing device, determining whether the first, second and third responses are qualifying responses as a function of the first, second and third response times and the minimum time necessary for a human to read and respond to the first, second and third prompts.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Provided herein are exemplary systems and methods for an intelligent secure networked system configured by at least one processor to execute instructions stored in memory, the system including a data retention system and an emotional analytics system, the emotional analytics system performing asynchronous processing to determine if interactions with a user's computing device are such that the user is responding from an emotional state of mind or a meditated state of mind.

A web services layer, according to exemplary embodiments, provides access to the data retention and the emotional analytics system. An application server layer transmits a request to the web services layer for data, the request processed by the batching service transparently to the user, the request processed by the batching service transparently to the user such that the user can continue to use the user-facing application without disruption, the application server layer including a high speed data corridor established between the application server layer and the user's computing device that provides a user-facing application that accesses the data retention and the emotional analytics system through the web services layer, and performs processing based on user interaction with the user-facing application.

In exemplary embodiments, the user-facing application is configured to execute instructions including receiving a first entry from the user's computing device during a first session, transmitting a first digital data element to the interactive graphical user interface of the user's computing device, the first digital data element causing the user's interactive graphical user interface to initiate a second session from the user's computing device while freezing operation of the first session until completion of a final session. Additionally, the first digital data element has three sub elements, sub element 1, sub element 2 and sub element 3 placed horizontally or vertically next to each other. Random variation of an order of presentation of the three sub elements each time the first digital data element is transmitted may be performed.

Upon receiving a second entry from the user's computing device, in various exemplary embodiments, a second digital data element may be transmitted to the interactive graphical user interface of the user's computing device, the second digital data element causing the user's interactive graphical user interface to initiate a third session. The second digital data element may have three sub elements, sub element 1, sub element 2, and sub element 3 placed horizontally or vertically next to each other and random variation of an order of presentation of the three sub elements may occur each time the second digital data element is transmitted. A third entry may be received from the user's computing device and a third digital data element may be transmitted to the interactive graphical user interface of the user's computing device, the third digital data element causing the user's interactive graphical user interface to initiate a final session. The third digital data element may have four sub elements, sub element 1, sub element 2, sub element 3 and sub element 4 placed horizontally or vertically next to each other and the order of presentation of the four sub elements may vary each time the third digital data element is transmitted. A fourth entry may be received from the user's computing device and complete the final session and complete the first session.

Further exemplary embodiments include training a neural network to receive a time required for receiving the second entry, a time required for receiving the third entry and a time required for receiving the fourth entry from 100% or nearly 100% of participating user computing devices that completed the first session and to determine a minimal time for each entry to represent a valid response and to associate each valid response to an associated conclusion. The neural network may be trained to segment a plurality of associated conclusions based on all entries satisfying from a participating user computer device meeting or exceeding the required time. Additionally, the neural network may be trained to segment the plurality of associated conclusions based on a predefined metric.

In various exemplary embodiments, the neural network may be trained to receive a time required for receiving the second entry, a time required for receiving the third entry and a time required for receiving the fourth entry from 100% or nearly 100% of participating user computing devices that completed the first session and to determine a maximum time for each entry to represent a valid response and to associate each valid response to an associated conclusion. The neural network may be trained to segment a plurality of associated conclusions based on all entries satisfying from a participating user computer device meeting or below the required time and training the neural network to segment the plurality of associated conclusions based on a predefined metric.

In some cases, the exemplary systems, methods and/or media herein may be referred to as "Customer Green" or "CustomerGreen" or the like.

Figure 1:
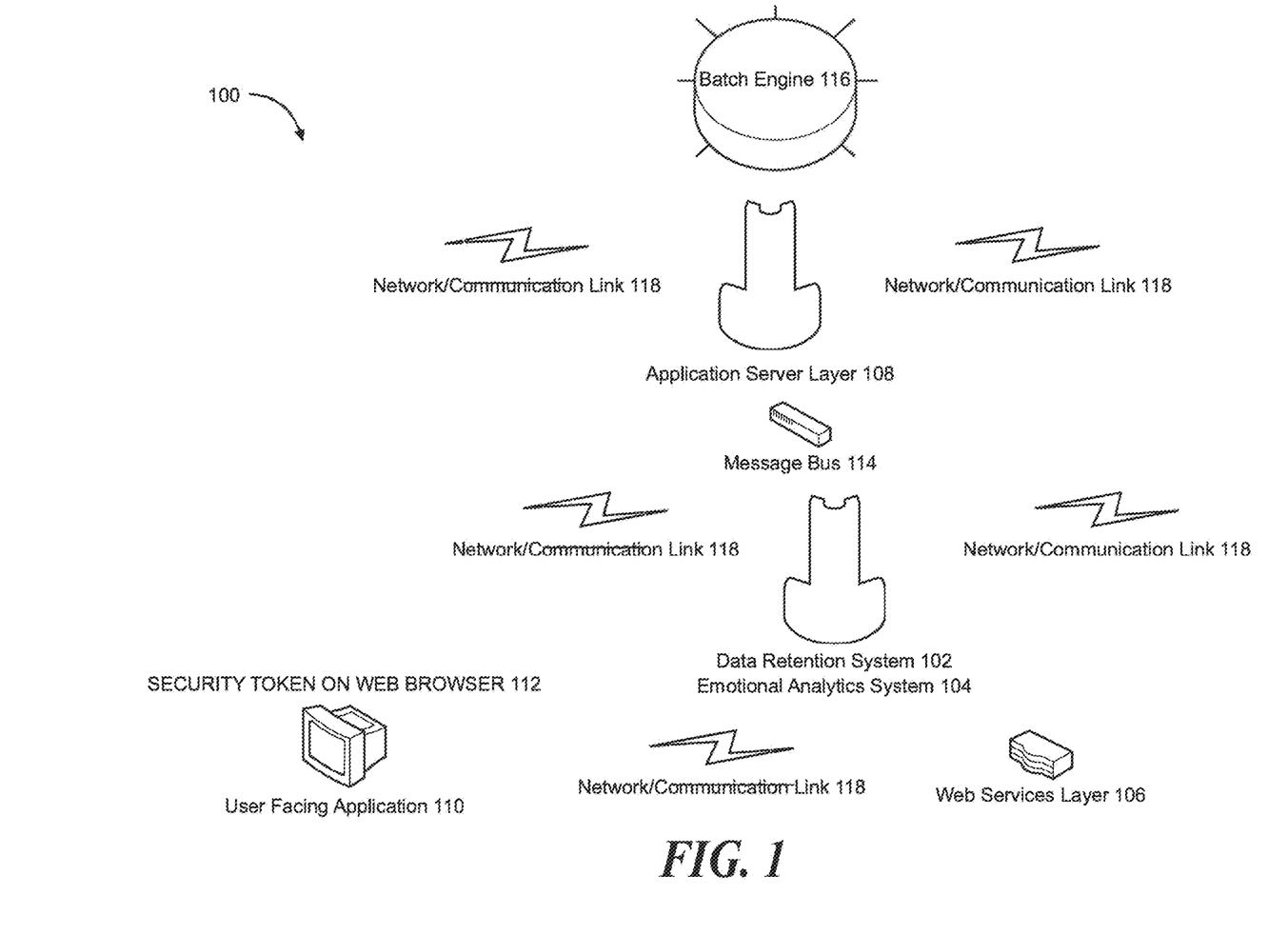
FIG. 1 is a schematic diagram of an exemplary computing architecture that includes a system constructed in accordance with the present disclosure.

FIG. 1 is a schematic diagram of an example secure messaging system (hereinafter system 100) for practicing aspects of the present disclosure. The system 100 comprises a data retention system 102, an emotional analytics system 104, a web services layer 106, and an application server layer 108 that provides, for example, modeling. Some or all of the activities occur over one or more network/communication links 118.

In some embodiments, the data retention system 102 and emotional analytics system 104 are in secure isolation from a remainder of the secure messaging system 100 through a security protocol or layer. The data retention system 102 can also provide additional services such as logic, data analysis, risk model analysis, security, data privacy controls, data access controls, disaster recovery for data and web services—just to name a few.

The web services layer 106 generally provides access to the data retention system 102. According to some embodiments, the application server layer 108 is configured to provide a user-facing application 110 that accesses the data retention 102 and emotional analytics 104 systems through the web services layer 106. In some embodiments, the user-facing application 110 is secured through use of a security token cached on a web browser 112 that provides the user-facing application 110.

In one or more embodiments, the application server layer 108 performs asynchronous processing based on user interaction with a messaging application that processes data from a user via the user-facing application 110. A messaging application can reside and execute on the application server layer 108. In other embodiments, the messaging application may reside with the emotional analytics system 104. In another embodiment, the messaging application can be a client-side, downloadable application.

The systems of the present disclosure may implement security features that involve the use of multiple security tokens to provide security in the system 100. Security tokens are used between the web services layer 106 and application server layer 108. In some embodiments, security features are not continuous to the web browser 112. Thus, a second security layer or link is established between the web browser 112 and application server layer, 108. In one or more embodiments, a first security token is cached in the application server layer 108 between the web browser 112 and the application server layer 108.

In some embodiments, the system 100 implements an architected message bus 114. In an example usage, a user requests a refresh of their data and user interface through their web browser 112. Rather than performing the refresh, which could involve data intensive and/or compute or operational intensive procedures by the system 100, the message bus 114 allows the request for refresh to be processed asynchronously by a batching process and provides a means for allowing the web browser 112 to continue to display a user-facing application to the user, allowing the user to continue to access data without waiting on the system 100 to complete its refresh.

Also, latency can be remediated at the user-facing application 110 based on the manner with which the user-facing application 110 is created and how the data that is displayed through the user-facing application 110 is stored and updated. For example, data displayed on the user-facing application 110 that changes frequently can cause frequent and unwanted refreshing of the entire user-facing application and interactive graphical user interfaces ("GUIs"). The present disclosure provides a solution to this issue by separating what is displayed on the GUI with the actual underlying data. The underlying data displayed on the GUI of the user-facing application 110 can be updated, as needed, on a segment-by-segment basis (could be defined as a zone of pixels on the display) at a granular level, rather than updating the entire GUI. That is, the GUI that renders the underlying data is programmatically separate from the underlying data cached by the client (e.g., device rendering the GUIs of the user-facing application 110). Due to this separation, when data being displayed on the GUI changes, re-rendering of the data is performed at a granular level, rather than at the page level. This process represents another example solution that remedies latency and improves user experiences with the user-facing application 110.

To facilitate these features, the web browser 112 will listen on the message bus 114 for an acknowledgement or other confirmation that the background processes to update the user account and/or the user-facing application have been completed by the application server layer 108. The user-facing application (or even part thereof) is updated as the system 100 completes its processing. This allows the user-facing application 110 provided through the web browser 112 to be usable, but heavy lifting is being done transparently to the user by the application server layer 108. In sum, these features prevent or reduce latency issues even when an application provided through the web browser 112 is "busy." For example, a re-balance request is executed transparently by the application server layer 108 and batch engine 116. This type of transparent computing behavior by the system 100 allows for asynchronous operation (initiated from the application server layer 108 or message bus 114).

In some embodiments, a batch engine 116 is included in the system 100 and works in the background to process re-balance requests and coordinate a number of services. An example re-balance request would include an instance where a user selectively makes a data request. The batch engine 116 will transparently orchestrate the necessary operations required by the application sever layer 108 in order to obtain data.

According to some embodiments, the batch engine 116 is configured to process requests transparently to a user so that the user can continue to use the user-facing application 110 without disruption. For example, this transparent processing can occur when the application server layer 108 transmits a request to the web services layer 106 for data, and a time required for updating or retrieving the data meets or exceeds a threshold. For example, the threshold might specify that if the request will take more than five seconds to complete, then the batch engine 116 can process the request transparently. The selected threshold can be system configured.

In some embodiments, security of data transmission through the system 100 is improved by use of multiple security tokens. In one embodiment a security token cached on the web browser 112 is different from a security protocol or security token utilized between the application server layer 108 and the web services layer 106.

In some exemplary embodiments, system 100 may include a neural network that is a framework of machine learning algorithms that work together to classify inputs based on a previous training process.

For example, feedback responses as described herein may be transmitted back to the data retention system 102 and/or the emotional analytics system 104. The neural network may be trained to receive a time required for receiving a first entry, a time required for receiving a second entry and a time required for receiving a third entry from 100% or nearly 100% of participating user computing devices that completed the feedback questions. The neural network may determine if each response is a valid response in terms of being from a responder's desired conscious or subconscious state of mind. Further training may include associating the valid responses to an associated conclusion. The neural network may also segment the plurality of associated conclusions based on a predefined metric (e.g., revenue).

Figure 2:
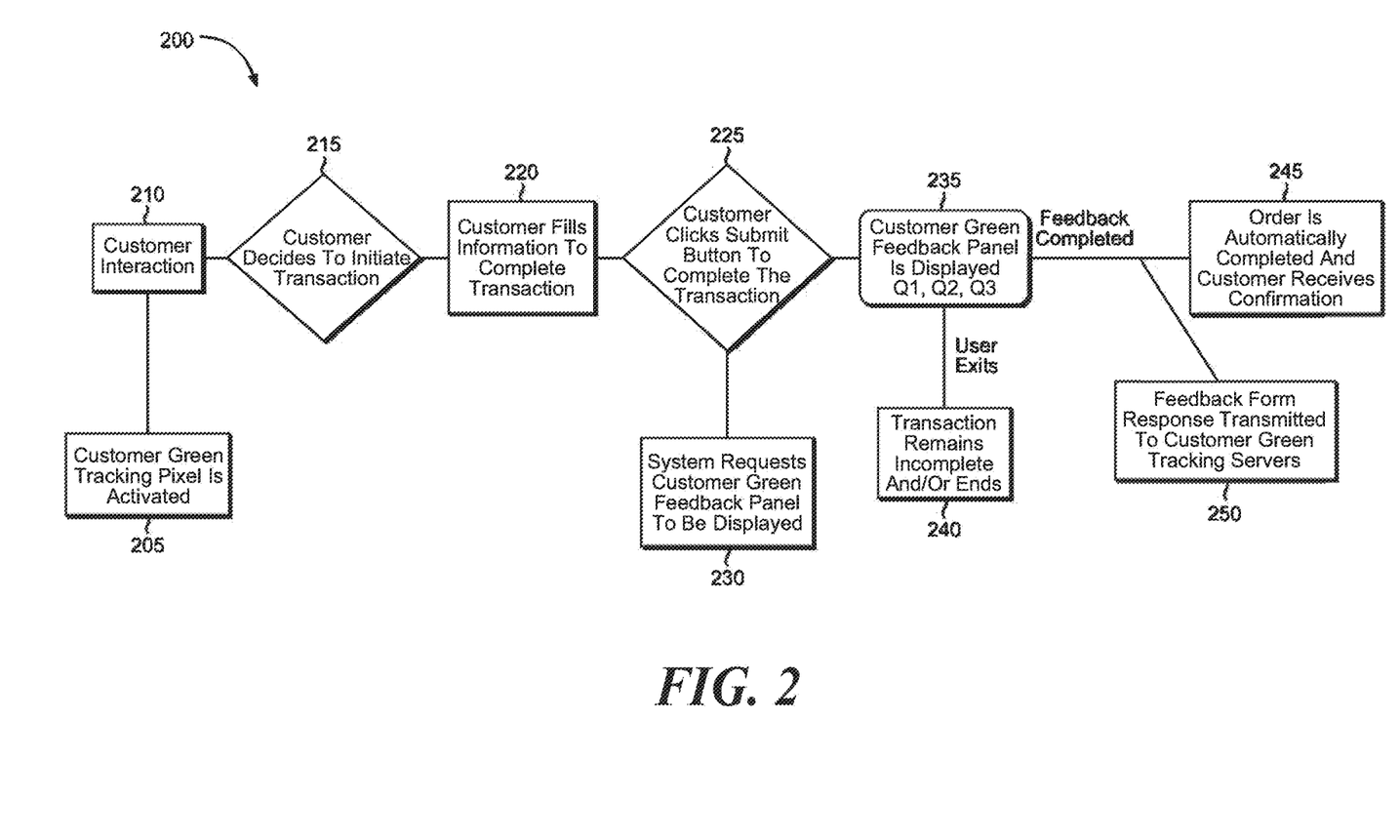
FIG. 2 shows a flow chart with exemplary steps required to complete a transaction to purchase a product.

FIG. 2 shows a flow chart with exemplary steps required to complete a transaction to purchase a product.

At step 205, a tracking pixel is activated.

At step 210, customer interaction is initiated.

At step 215, the customer decides to initiate a transaction.

At step 220, the customer provides the information necessary to purchase a product or service. This information generally includes an address for shipment, payment or account information, and other data necessary to make the purchase. The system may optionally, at the conclusion of this step, begin to identify feedback questions to be posed to the customer prior to completion of the transaction.

At step 225, the customer is presented with a mechanism (e.g. a "submit" or "continue" button or similar indicia) to complete the transaction.

At step 230, the system requests a feedback panel to be displayed.

At step 235, the customer is presented a feedback panel with one or more feedback questions which can be presented in a random or specific sequence at the vendor's option. In order to advance the transaction, the customer must respond to the feedback question or questions.

At step 240, the transaction remains incomplete and/or ends. To make it clear to the customer that a response to the feedback question is necessary in order to continue, the submit mechanism (e.g., button) used to advance the transaction is disabled through a routine that continuously checks to determine whether all of the feedback questions have been responded to by the customer. As long as the feedback request is incomplete the submit mechanism remains disabled. If the customer does not complete all of the questions, he or she (according to some embodiments) must initiate the survey all over again. However, if the customer does indeed complete the feedback request, at step 245, the order is automatically completed, and the customer receives a confirmation.

At step 250, feedback form response is transmitted to the tracking server(s) and/or data retention system 102 (FIG. 1) and/or emotional analytics system 104 (FIG. 1).

Figure 3:
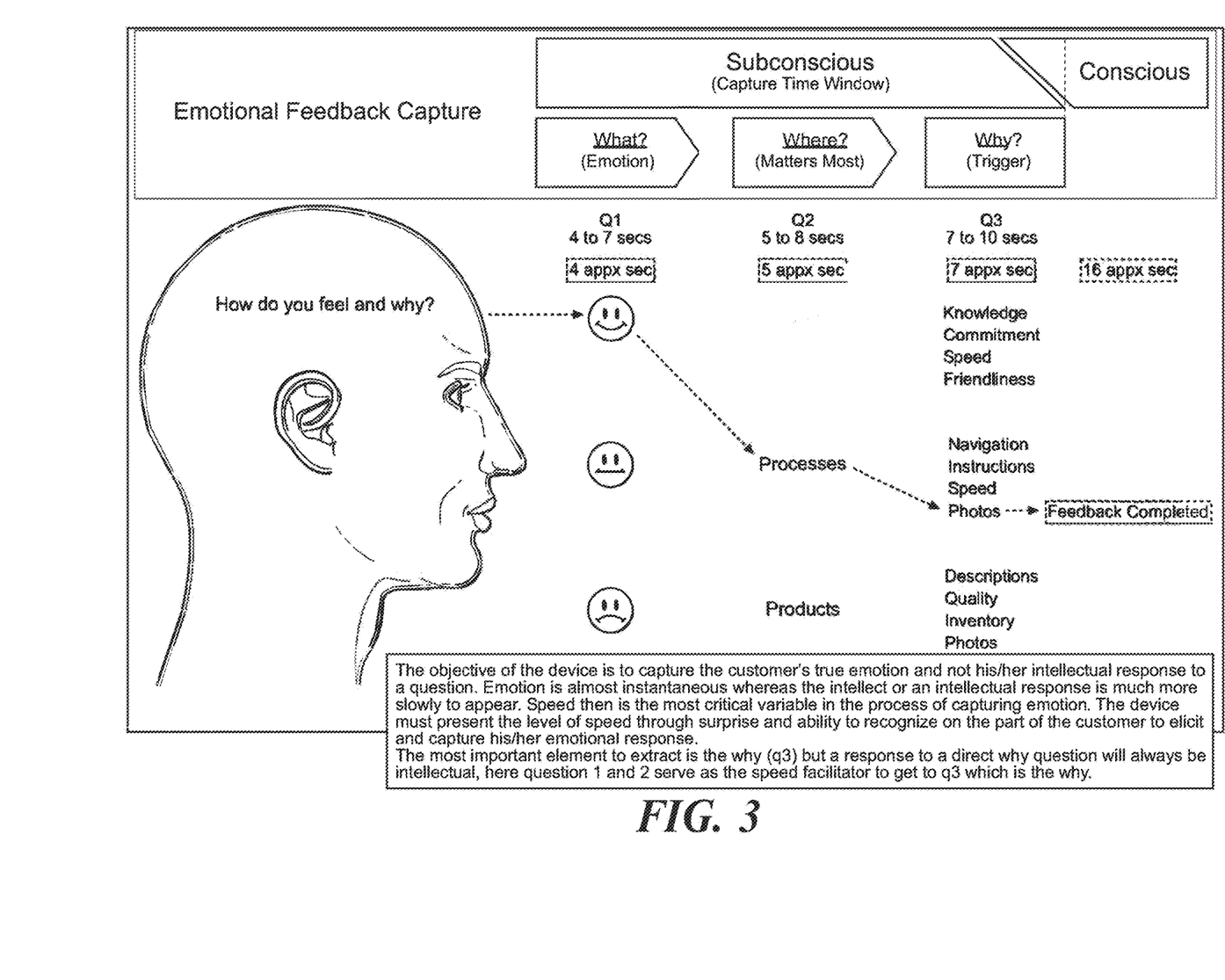
FIG. 3 is an exemplary overview of capturing quality feedback, that is, to capture a customer's true emotion, guaranteeing quality feedback.

FIG. 3 is an exemplary overview of capturing quality feedback. According to exemplary embodiments, the emotional analytics system performs asynchronous processing to determine if interactions with a user's computing device are such that the user is responding from an emotional state of mind or a meditated state of mind. A batching service, with an application server layer transmitting a request to the web services layer for data, the request processed by the batching service transparently to the user, provides for the user's emotion-based interactions with the system, because the request processed by the batching service transparently to the user is such that the user can continue to use the user-facing application without disruption. The application server layer with a high speed data corridor established between the application server layer and the user's computing device provides a user-facing application that accesses the data retention and the emotional analytics system through the web services layer and performs processing based on user interaction with the user-facing application that executes instructions including receiving a first entry from the user's computing device during a first session (e.g., starting a transaction), transmitting a first digital data element to the interactive graphical user interface of the user's computing device, the first digital data element causing the user's interactive graphical user interface to initiate a second session (e.g., requesting an emotion selection) from the user's computing device while freezing operation of the first session (e.g. the transaction) until completion of a final session (e.g., requesting a trigger).

Additionally, the first digital data element has three sub elements, sub element 1, sub element 2 and sub element 3 (e.g., the emotion faces) placed horizontally or vertically next to each other. These faces can randomly vary in order of presentation each time transmitted. A second entry from the user's computing device causes the user's interactive graphical user interface to initiate a third session (e.g., for the selection of people, process, or products from a user). Receiving a third entry from the user's computing device causes the user's interactive graphical user interface to initiate a final session (e.g., requesting a selection of a trigger from a user). Receiving a fourth entry (e.g., the trigger selection) from the user's computing device completes the final session. Now the first session (e.g., the transaction) is completed.

Figure 4:
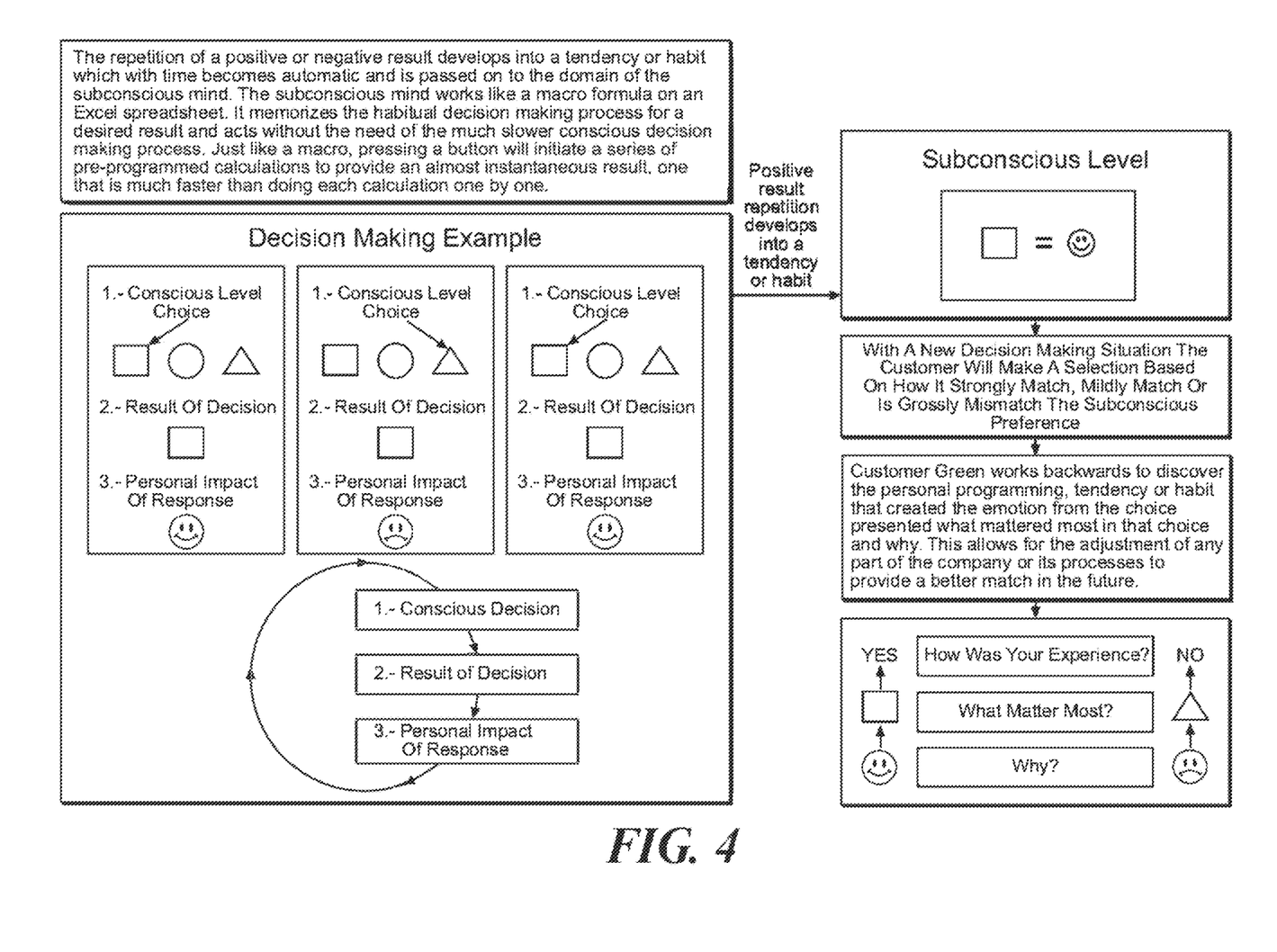
FIG. 4 illustrates the forming of a habit in the subconscious level and how the CustomerGreen system is able to detect if an event is congruent with it or not.

FIG. 4 illustrates the forming of a habit in the subconscious level and how the CustomerGreen system is able to detect if an event is congruent with it or not.

As shown in FIG. 4, at a conscious level, a person presented with a particular environment may make a conscious decision, that may generate an action and/or response. The action and/or response may generate a result. With repetition, this process may generate a subconscious habit. Should a person encounter the particular environment that doesn't match the expected result of the subconscious habit, it may be noted at the person's conscious level. This is detected by the CustomerGreen system, capturing the emotional response of the customer experience.

Figure 5:
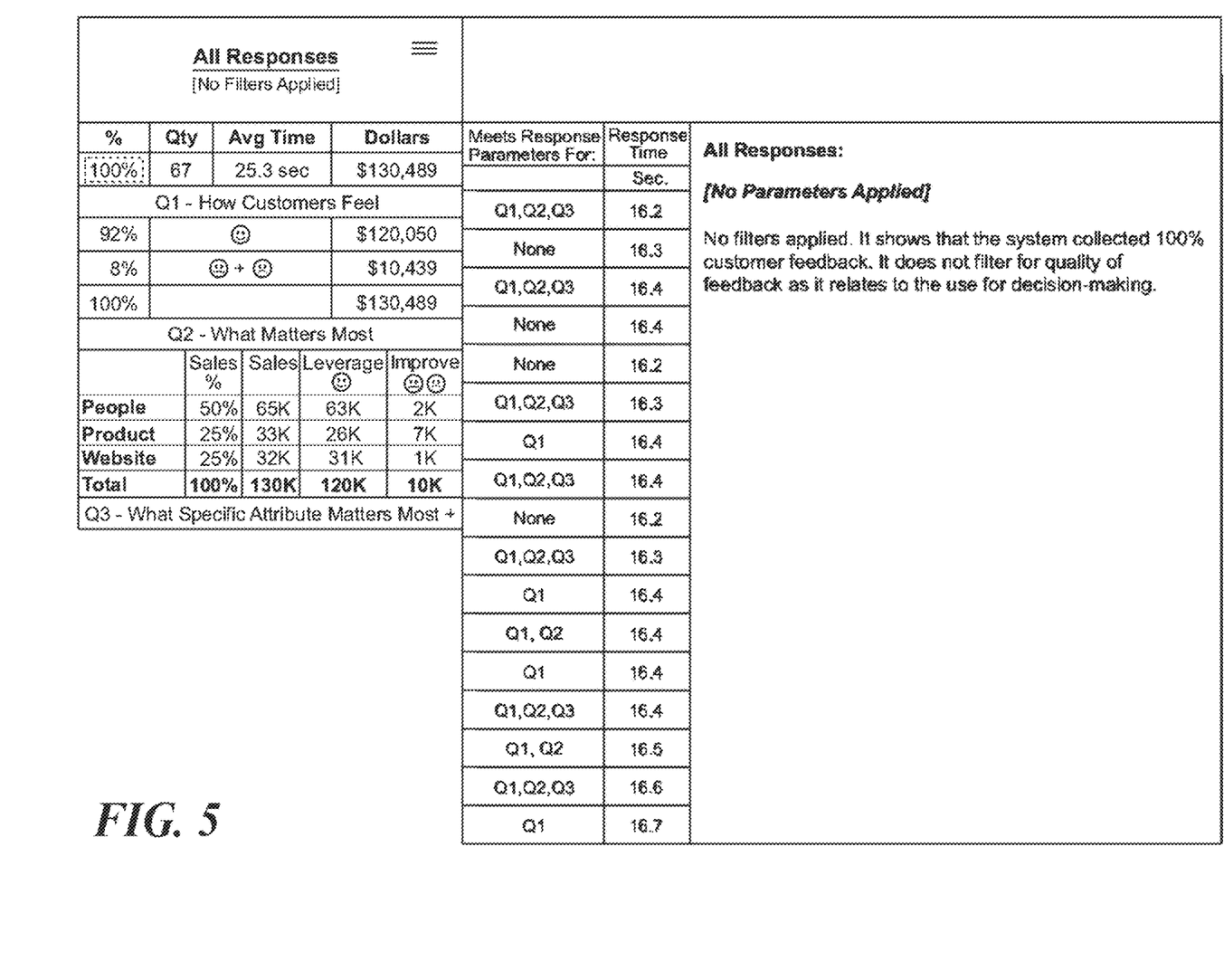
FIG. 5 illustrates an exemplary scenario where customer feedback is organized by sentiment but quality filters are not applied.

FIG. 5 illustrates a scenario where filtering of customer feedback is not applied. Here, there is no determination of the quality of the customer feedback. In many exemplary embodiments, the customer feedback represents 100% of the customers that have completed a transaction. In other embodiments, the customer feedback represents nearly 100% of the customers that have initiated and/or completed a transaction.

Figure 6:
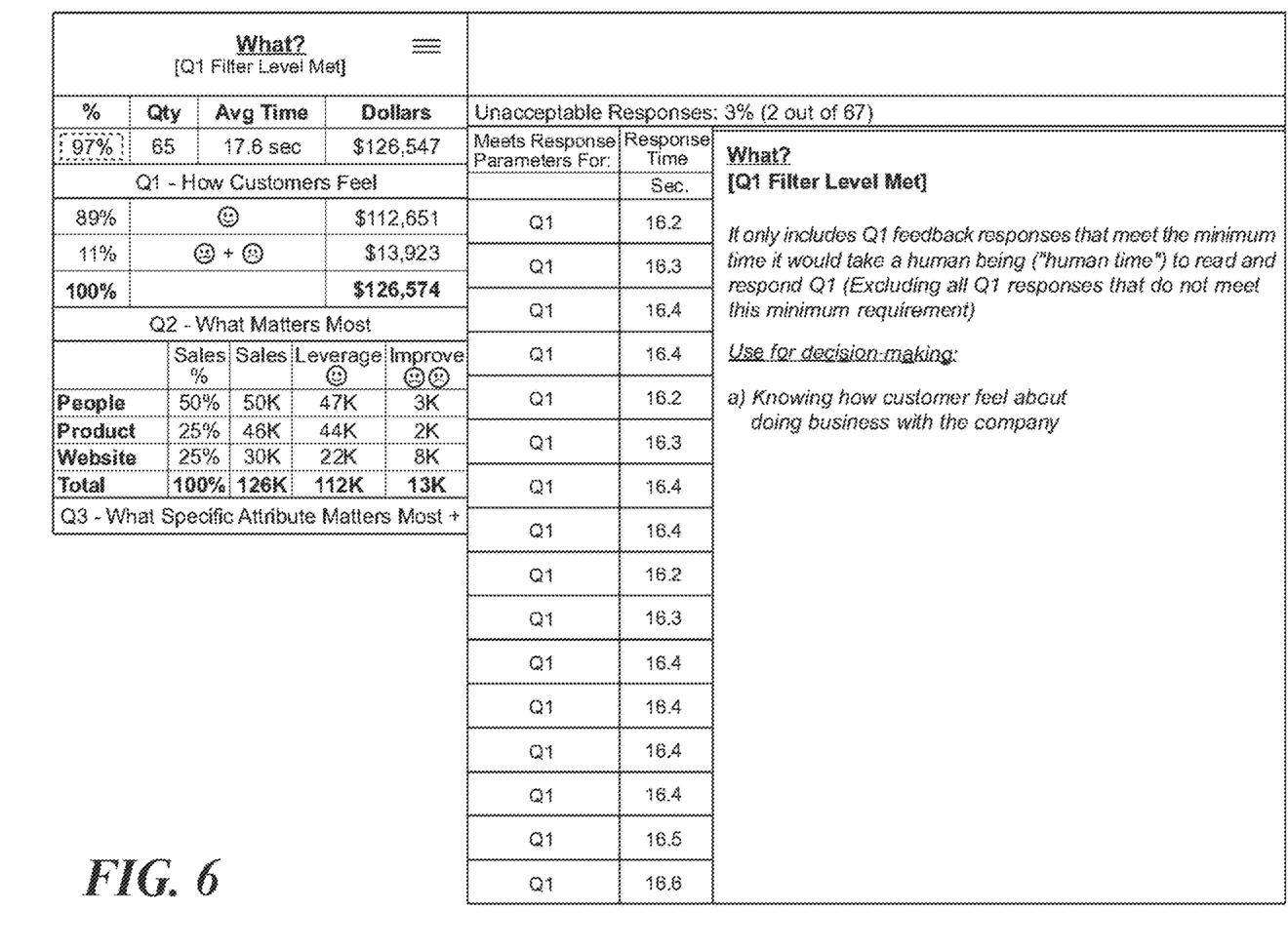
FIG. 6 illustrates an exemplary scenario where customer feedback is organized by sentiment, and quality filters are applied to responses to question 1 (i.e., what is the main emotion related to the experience: happy, neutral or sad).

FIG. 6 illustrates a scenario where question 1 (e.g., the emotion faces) responses are filtered. It includes question 1 feedback responses that meet the minimum time required and do not exceed the maximum time required it would take a human to read and respond to question 1 based on an emotional level. Typically, the answer will be a quick recognition because there are not that many variables for consideration and/or because it is spontaneous/emotional because it occurs at a subconscious level. For decision making, one knows how customers feel about doing business with a company.

Figure 7:
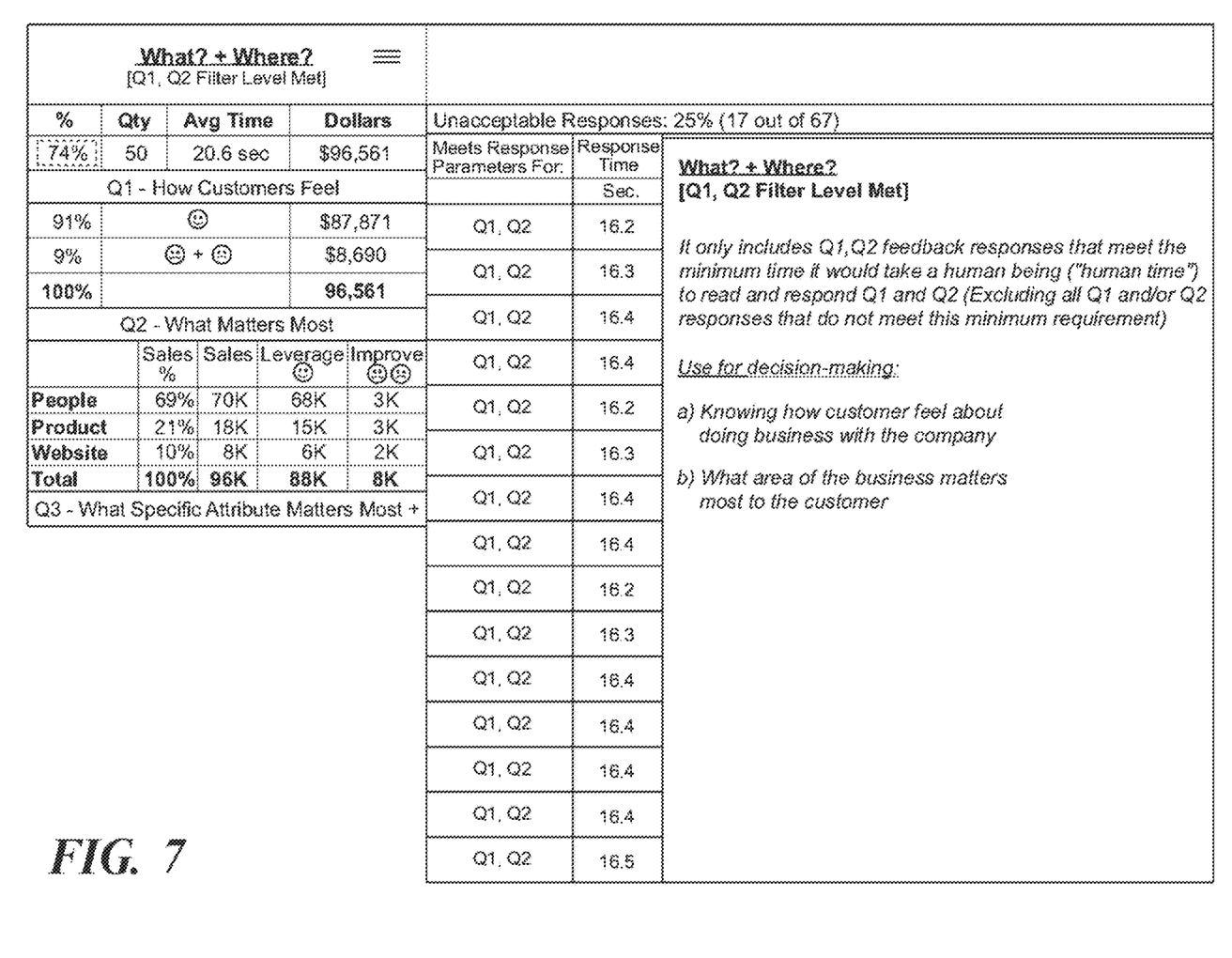
FIG. 7 illustrates an exemplary scenario where customer feedback is organized by sentiment, and quality filters are applied to responses to question 1 (i.e., what is the main emotion related to the experience: happy, neutral or sad) and to question 2 (i.e., where did the emotion come from, what mattered most: people, product, or process).

FIG. 7 illustrates a scenario where question 1 (e.g., the emotion faces) and question 2 (e.g., people, process, or products) responses are filtered. It includes question 1 and question 2 feedback responses that meet the minimum time required and do not exceed the maximum time required it would take a human to read and respond to question 1 on an emotional level and question 2 based on more of a subconscious level. Please note: both answers to question 1 and 2 occur at a subconscious level. Question 2 typically involves what a customer has direct experience with, versus what may happen behind the scenes e.g., in the accounting department. For decision making, one knows how customers feel about doing business with a company and what area of the business matters most to the customer.

Figure 8:
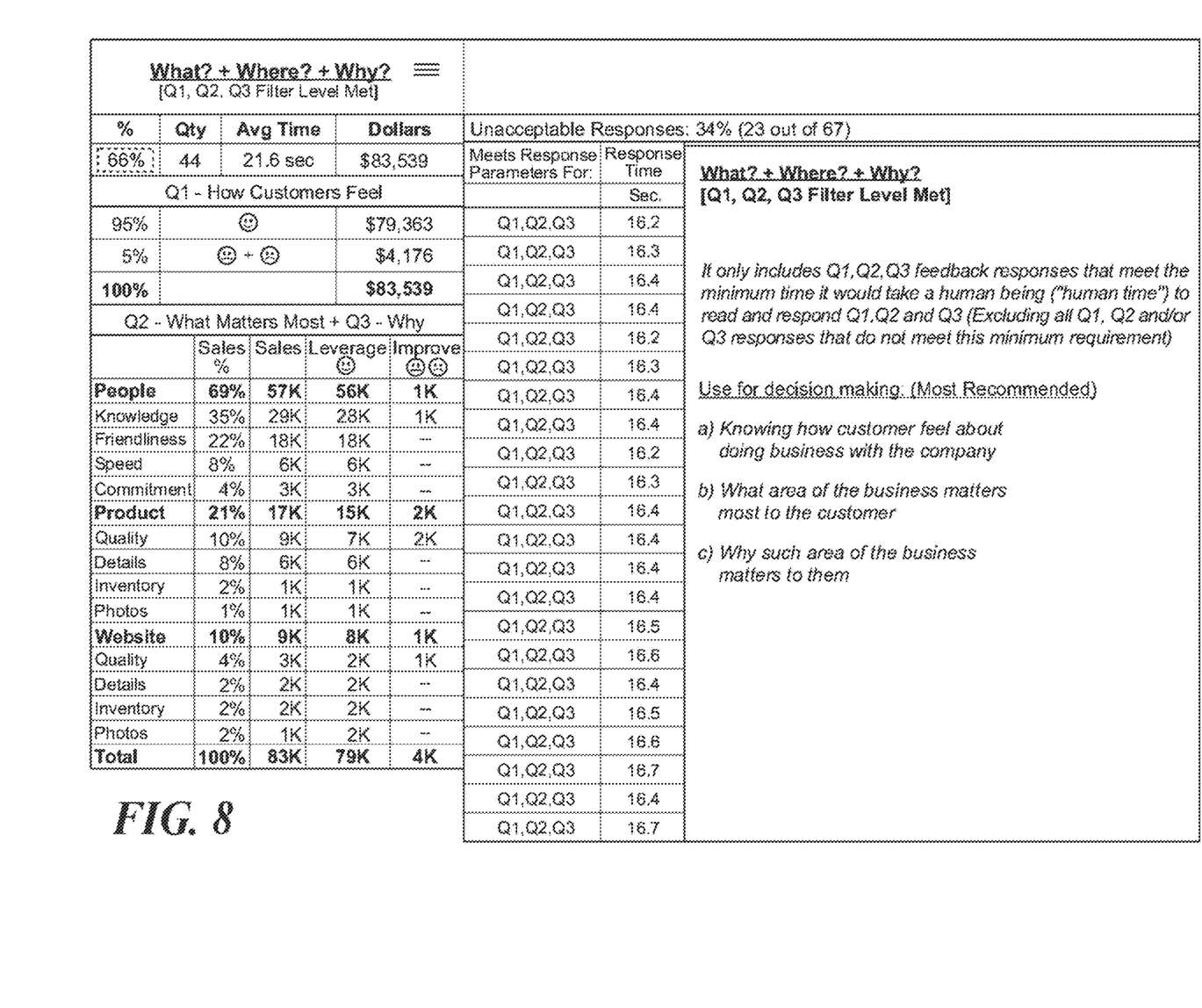
FIG. 8 illustrates an exemplary scenario where customer feedback is organized by sentiment, and quality filters are applied to responses to question 1 (i.e., what is the main emotion related to the experience: happy, neutral or sad) and to question 2 (i.e., where did the emotion come from, what mattered most: people, product, or process) and to question 3 (i.e. why did the customer feel that way, which was the trigger).

FIG. 8 illustrates a scenario where question 1 (e.g., the emotion faces), question 2 (e.g., people, process, or products) and question 3 (e.g., triggers) responses are filtered. It includes question 1, question 2 and question 3 feedback responses that meet the minimum time required and do not exceed the maximum time required it would take a human to read and respond to question 1 on an emotional level, question 2 on more of a subconscious level, and question 3 based on more of a conscious level. Please note: both answers to question 1 and 2 occur at a subconscious level. Additionally, response times that exceed the maximum suggest the response is based on a conscious level and response times that fall below the minimum suggest the response was from someone aimlessly clicking through the possible response choices.

In many exemplary embodiments, minimum and maximum response times are determined for each question by establishing a bell curve for the entire population of responses for each question and selecting a certain percentage of responses around both sides of the middle of the bell curve for each question. Additionally, this can be performed for new and returning customers, as well as customers returning products. In the case of customers returning products, similar to the case of completing a purchase transaction, the customer will have to complete the questionnaire prior to completing the product return. As the number of responses increases and/or the certain percentages may change, the minimum and maximum response times may be recalculated.

Figure 9:
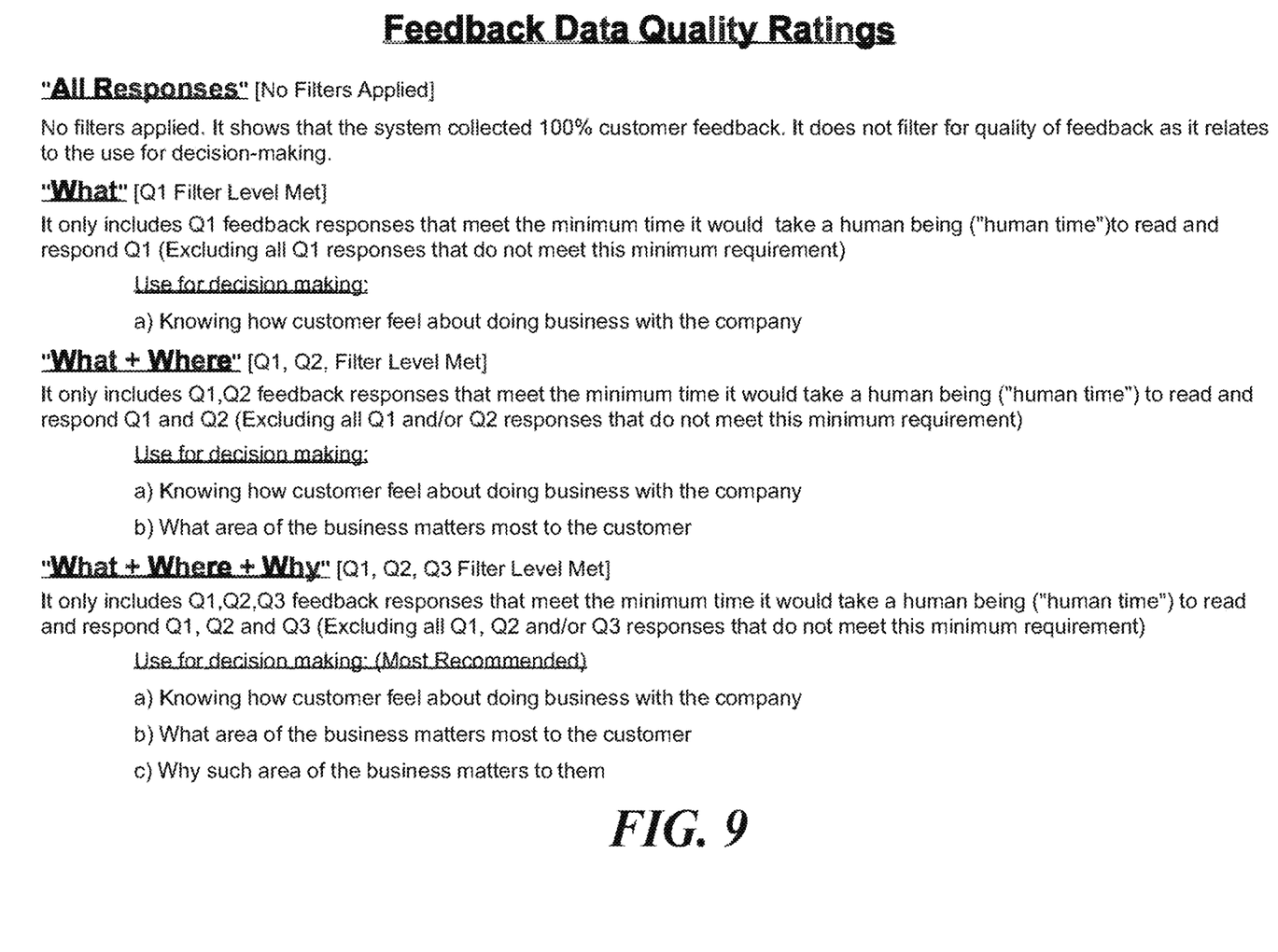
FIG. 9 summarizes exemplary feedback data quality filters and its use for decision making.

FIG. 9 summarizes exemplary feedback data quality filters and its use for decision making.

Figure 10:
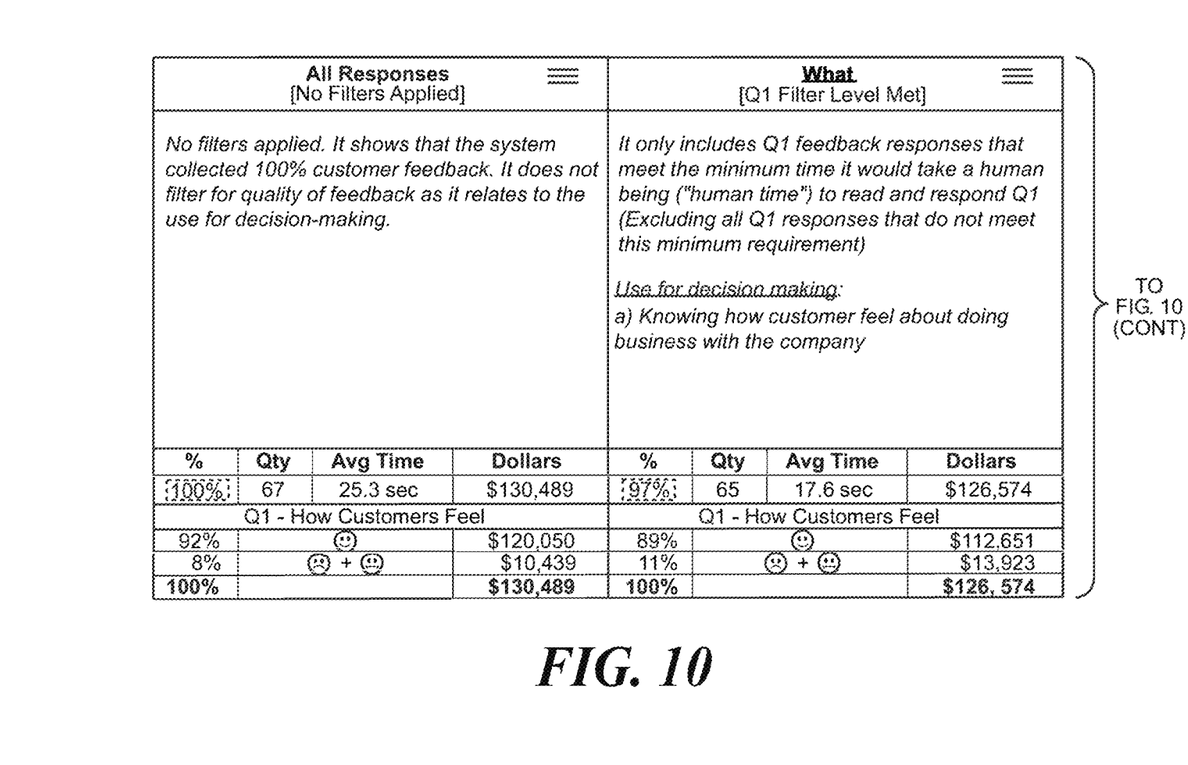
FIG. 10 illustrates an exemplary feedback dashboard, where different feedback quality feedback filters are applied from the control panel. It prioritizes and monetizes all responses.

FIG. 10 prioritizes and monetizes feedback data quality ratings. As shown in FIG. 10, for each question, and for the total of qualifying responses (e.g., meeting the time limitations) as well as the associated total dollars, a determination may be made for areas to prioritize. For example, in FIG. 10, for customer responses satisfying the criteria for questions 1 and 2, 91% of the happy customers as determined by question 1 indicated that people matter most, as determined by question 2, as shown by 69% of the 91% of happy customers and their approximately $70,000 of sales.

According to various exemplary embodiments, a neural network may be trained to receive a time required for receiving the second entry, a time required for receiving the third entry and a time required for receiving the fourth entry from 100% or nearly 100% of participating user computing devices that completed the first session and to determine a minimal and a maximum time for each entry to represent a valid response and to associate each valid response to an associated conclusion. A neural network is a framework of machine learning algorithms that work together to classify inputs based on a previous training process.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system for gathering qualifying responses, the system comprising:
 a user device configured to:
  communicate to the user a first prompt as, wherein the first prompt is directed to the user's emotion;
  receive a first response from the user;
  determine a first response time;
  communicate to the user a second prompt, wherein the second prompt is directed to a cause of the user's emotion, wherein the second prompt is communicated to the user after the first prompt is communicated to the user;
  receive a second response from the user;
  determine a second response time;
  communicate to the user a third prompt, wherein the third prompt is directed to a more specific cause of the user's emotion, wherein the third prompt is communicated to the user after the second prompt is communicated to the user;
  receive a third response from the user; and
  determine a third response time; and
  transmit the first, second, and third responses, and the first, second, and third response times to a computing device; and
 a computing device configured to:
  receive the first, second, and third responses, and the first, second, and third response times from the user device;
  identify the minimum time necessary for a human to read and respond to the first prompt;
  identify the minimum time necessary for a human to read and respond to the second prompt;
  identify the minimum time necessary for a human to read and respond to the third prompt; and
  determine whether the first, second and third responses are qualifying responses as a function of the first, second and third response times and the minimum time necessary for a human to read and respond to the first, second and third prompts.

2. The system of claim 1, wherein the first, second and third responses are determined not to be qualifying responses if the first response time is less than the minimum time necessary for a human to read and respond to the first prompt.

3. The system of claim 1, wherein the first, second and third responses are determined not to be qualifying responses if the second response time is less than the minimum time necessary for a human to read and respond to the second prompt.

4. The system of claim 1, wherein the first, second and third responses are determined not to be qualifying responses if the third response time is less than the minimum time necessary for a human to read and respond to the third prompt.

5. The system of claim 1, wherein the computing device is configured to identify a maximum response time for the first prompt, a maximum response time for the second prompt, and a maximum response time for the third prompt.

6. The system of claim 5, wherein the minimum time necessary for a human to respond to the first, second and third prompts and the maximum response times for the first, second and third prompts are determined for each prompt by establishing a bell curve for the entire population of responses for each prompt and selecting a cutoff point on each side of each bell curve.

7. The system of claim 5, wherein the minimum time necessary for a human to read and respond to the first prompt is 4 seconds, wherein the maximum response time for the first prompt is 7 seconds.

8. The system of claim 7, wherein the total minimum time necessary for a human to read and respond to the first and second prompts is 5 seconds, wherein the total maximum response time for the first and second prompts is 8 seconds.

9. The system of claim 8, wherein the total minimum time necessary for a human to read and respond to the first, second and third prompts is 7 seconds, wherein the total maximum response time for the first, second and third prompts is 10 seconds.

10. The system of claim 1, wherein the user device is configured to communicate the first prompt to the user as a function of user input.

11. A method of gathering qualifying responses, the method comprising:
using a user device, communicating to the user a first prompt as, wherein the first prompt is directed to the user's emotion;
using a user device, receiving a first response from the user;
using a user device, determining a first response time;
using a user device, communicating to the user a second prompt, wherein the second prompt is directed to a cause of the user's emotion, wherein the second prompt is communicated to the user after the first prompt is communicated to the user;
using a user device, receiving a second response from the user;
using the user device, determining a second response time;
using the user device, communicating to the user a third prompt, wherein the third prompt is directed to a more specific cause of the user's emotion, wherein the third prompt is communicated to the user after the second prompt is communicated to the user;
using the user device, receiving a third response from the user; and
using the user device, determining a third response time; and
using the user device, transmitting the first, second, and third responses, and the first, second, and third response times to a computing device; and
using a computing device, receiving the first, second, and third responses, and the first, second, and third response times from the user device;
using the computing device, identifying the minimum time necessary for a human to read and respond to the first prompt;
using the computing device, identifying the minimum time necessary for a human to read and respond to the second prompt;
using the computing device, identifying the minimum time necessary for a human to read and respond to the third prompt; and
using the computing device, determining whether the first, second and third responses are qualifying responses as a function of the first, second and third response times and the minimum time necessary for a human to read and respond to the first, second and third prompts.

12. The method of claim 11, wherein the first, second and third responses are determined not to be qualifying responses if the first response time is less than the minimum time necessary for a human to read and respond to the first prompt.

13. The method of claim 11, wherein the first, second and third responses are determined not to be qualifying responses if the second response time is less than the minimum time necessary for a human to read and respond to the second prompt.

14. The method of claim 11, wherein the first, second and third responses are determined not to be qualifying responses if the third response time is less than the minimum time necessary for a human to read and respond to the third prompt.

15. The method of claim 11, wherein the computing device is configured to identify a maximum response time for the first prompt, a maximum response time for the second prompt, and a maximum response time for the third prompt.

16. The method of claim 15, wherein the minimum time necessary for a human to respond to the first, second and third prompts and the maximum response times for the first, second and third prompts are determined for each prompt by establishing a bell curve for the entire population of responses for each prompt and selecting a cutoff point on each side of each bell curve.

17. The method of claim 15, wherein the minimum time necessary for a human to read and respond to the first prompt is 4 seconds, wherein the maximum response time for the first prompt is 7 seconds.

18. The method of claim 17, wherein the total minimum time necessary for a human to read and respond to the first and second prompts is 5 seconds, wherein the total maximum response time for the first and second prompts is 8 seconds.

19. The method of claim 18, wherein the total minimum time necessary for a human to read and respond to the first, second and third prompts is 7 seconds, wherein the total maximum response time for the first, second and third prompts is 10 seconds.

20. The method of claim 11, wherein the user device is configured to communicate the first prompt to the user as a function of user input.

* * * * *